US00RE43198E

(19) United States
(12) Reissued Patent
Anderson

(10) Patent Number: US RE43,198 E
(45) Date of Reissued Patent: Feb. 21, 2012

(54) TANGENTIALLY-LOADED HIGH-LOAD RETRIEVABLE SLIP SYSTEM

(75) Inventor: Gary L. Anderson, Humble, TX (US)

(73) Assignee: Baker Hughes Incorporated, Houston, TX (US)

(21) Appl. No.: 12/837,629

(22) Filed: Jul. 16, 2010

Related U.S. Patent Documents

Reissue of:
(64) Patent No.: 7,614,449
Issued: Nov. 10, 2009
Appl. No.: 11/835,695
Filed: Aug. 8, 2007

(51) Int. Cl.
*E21B 23/00* (2006.01)
(52) U.S. Cl. ..... 166/216; 166/217; 166/382
(58) Field of Classification Search ..... 166/216, 166/217, 134, 382
See application file for complete search history.

(56) References Cited

U.S. PATENT DOCUMENTS 4,311,196 A 1/1982 Beall et al.
4,576,230 A 3/1986 Tapp et al.
6,119,774 A 9/2000 Doane et al.
6,213,204 B1 4/2001 Doane
2004/0244966 A1 12/2004 Zimmerman et al.
2009/0014173 A1* 1/2009 MacLeod et al. ..... 166/216

OTHER PUBLICATIONS

Halliburton; "Production Packers"; Jul. 2007; 6 pages.
International Search Report and Written Opinion Mailed Feb. 27, 2009, Written Opinion 7 pages, Ineternational Search Report 3 pages.

* cited by examiner

*Primary Examiner* — Giovanna Wright
(74) *Attorney, Agent, or Firm* — Steve Rosenblatt

(57) ABSTRACT

A slip system includes a set of drive slips having wickers thereon, substantially all of which being truncated in cross-section; a set of gripping slips operatively interengagable with the set of drive slips; a drive slip end ring in operable communication with the set of drive slips; and a gripping slip end ring in operable communication with the set of gripping slips, the end rings capable of transmitting a load applied in an axial direction of the system to the set of gripping slips and the set of drive slips to tangentially load the set of drive slips and the set of gripping slips against each other thereby increasing a radial dimension of the system and distributing stresses created in a target tubular and method.

32 Claims, 5 Drawing Sheets

TANGENTIALLY-LOADED HIGH-LOAD RETRIEVABLE SLIP SYSTEM

Matter enclosed in heavy brackets [ ] appears in the original patent but forms no part of this reissue specification; matter printed in italics indicates the additions made by reissue.

BACKGROUND

In the hydrocarbon exploration and recovery industry, it is often necessary to anchor equipment within a tubular structure such as a casing or tubing string. A common and long used apparatus for such duty is a set of slips with attendant support structure. In some embodiments, slips are utilized with conical structures that impart radially outwardly directed impetus on each slip as the slip is axially moved along the cone, usually under a compressive load. While such configurations have been extensively used, it is also known that this type of configuration can become stuck in the tubular structure in which it has been set, thereby rendering retrieval thereof difficult.

In another embodiment of a slip configuration, the slips are tangentially loaded to avoid the need for the conical portion. Depending upon the configuration of these tangentially loaded systems, there has been difficulty in retrieval or difficulty in creating acceptable holding strength.

As the art to which this disclosure pertains is always interested in improved technology, the disclosure hereof is likely to be well received.

SUMMARY

A slip system includes a set of drive slips having wickers thereon, substantially all of which being truncated in cross-section; a set of gripping slips operatively interengagable with the set of drive slips; a drive slip end ring in operable communication with the set of drive slips; and a gripping slip end ring in operable communication with the set of gripping slips, the end rings capable of transmitting a load applied in an axial direction of the system to the set of gripping slips and the set of drive slips to tangentially load the set-of drive slips and the set of gripping slips against each other thereby increasing a radial dimension of the system and distributing stresses created in a target tubular.

A method for distributing stress in a target tubular imparted by a slip system includes embedding a plurality of sharp wickers of the slip system into the target tubular; and contacting an inside dimension of the target tubular with a plurality of truncated wickers.

BRIEF DESCRIPTION OF THE DRAWINGS

Referring now to the drawings wherein like elements are numbered alike in the several Figures.

DETAILED DESCRIPTION

Figure 1:
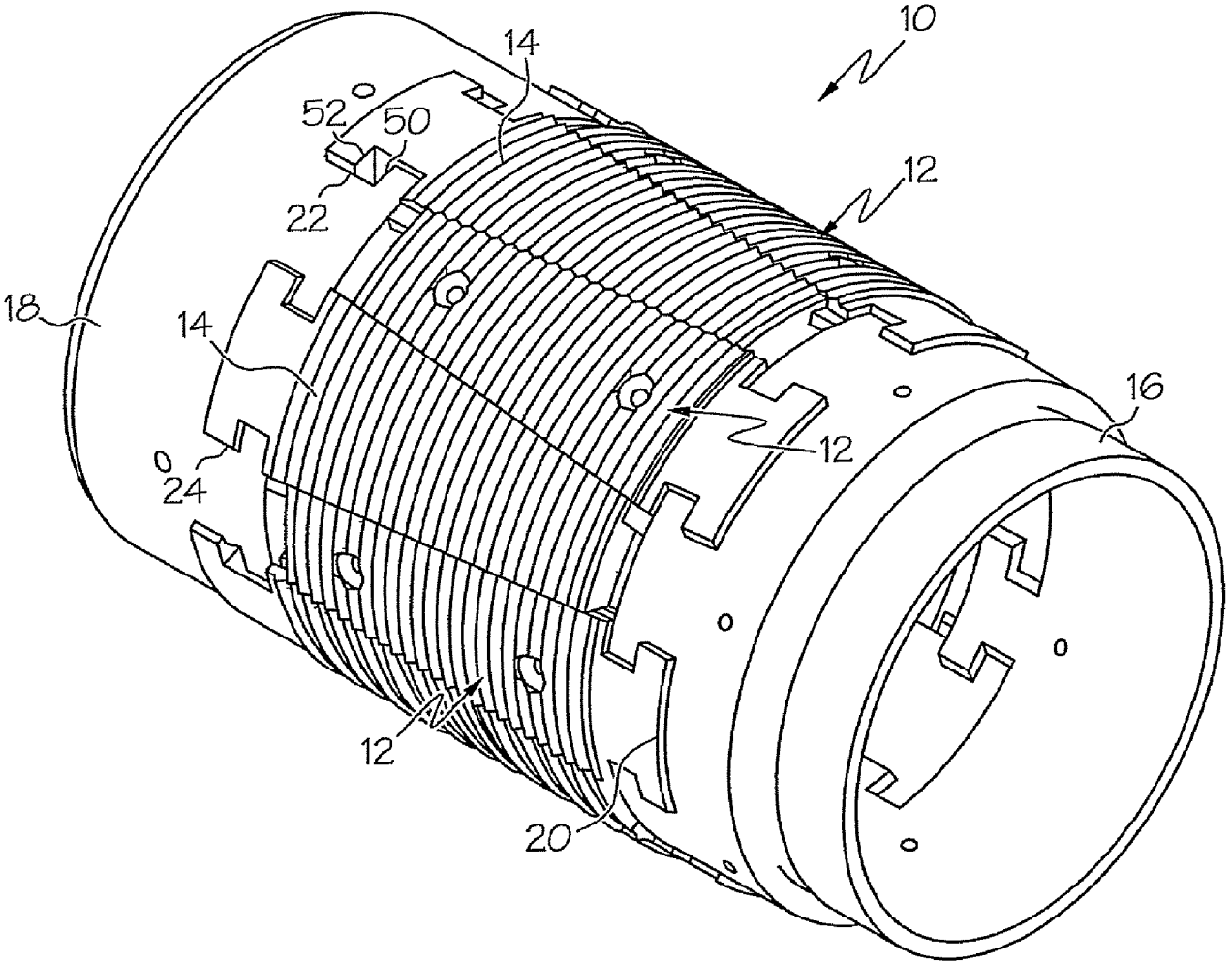
FIG. 1 is a perspective view of one embodiment of the slip system disclosed herein in a set position.

Referring to FIG. 1, the slip system 10 is illustrated in perspective view. Apparent in FIG. 1 is the configuration of a set of drive slips 12 and a set of grip slips 14 that together cooperate in a way that promotes tangential loading of the slips against one another to radially expand. Radial expansion is necessary to set the system 10 by driving certain portions of the wicker threads (numerically introduced and discussed hereunder) into a receiving tubular structure (not shown). System 10 further includes a drive slip ring 16 and a grip slip ring 18. Ring 16 is endowed with interengagement (for example, T-shaped) slots 20 about a perimeter thereof, each of the slots 20 being substantially the same shape and set of dimensions as each other. Ring 18 on the other hand, in one embodiment, includes a plurality of interengagement (for example, T-shaped) slots 22 disposed about a periphery thereof having a first set of dimensions and a plurality of interengagement (for example, T-shaped) slots 24 having another set of dimensions. In the illustrated embodiment of FIG. 1, slots 22 and 24 alternate (single alternating) around the perimeter of ring 18. It is to be understood, however, that more of slot 22 or slot 24 could be grouped together in alternate embodiments such as, for example, two slot 22's next to one another and two slot 24's next to one another alternating with the 22's (double alternating). Further, there is no requirement that there be any particular number of a certain type of slot 22 or 24, for example, there may only be one slot 24 or two slots 24, etc. or each slot could be unique as desired (random alternating).

In each of the rings 16 and 18, the position of slots 20, 22 or 24 are such, relative to each other, that slips 12 and 14 are alternately positioned when engaged with adjacent T-shaped slots in each ring. The alternate positioning of slips 12 and 14 is easily seen in FIGS. 1 and 2.

Figure 2:
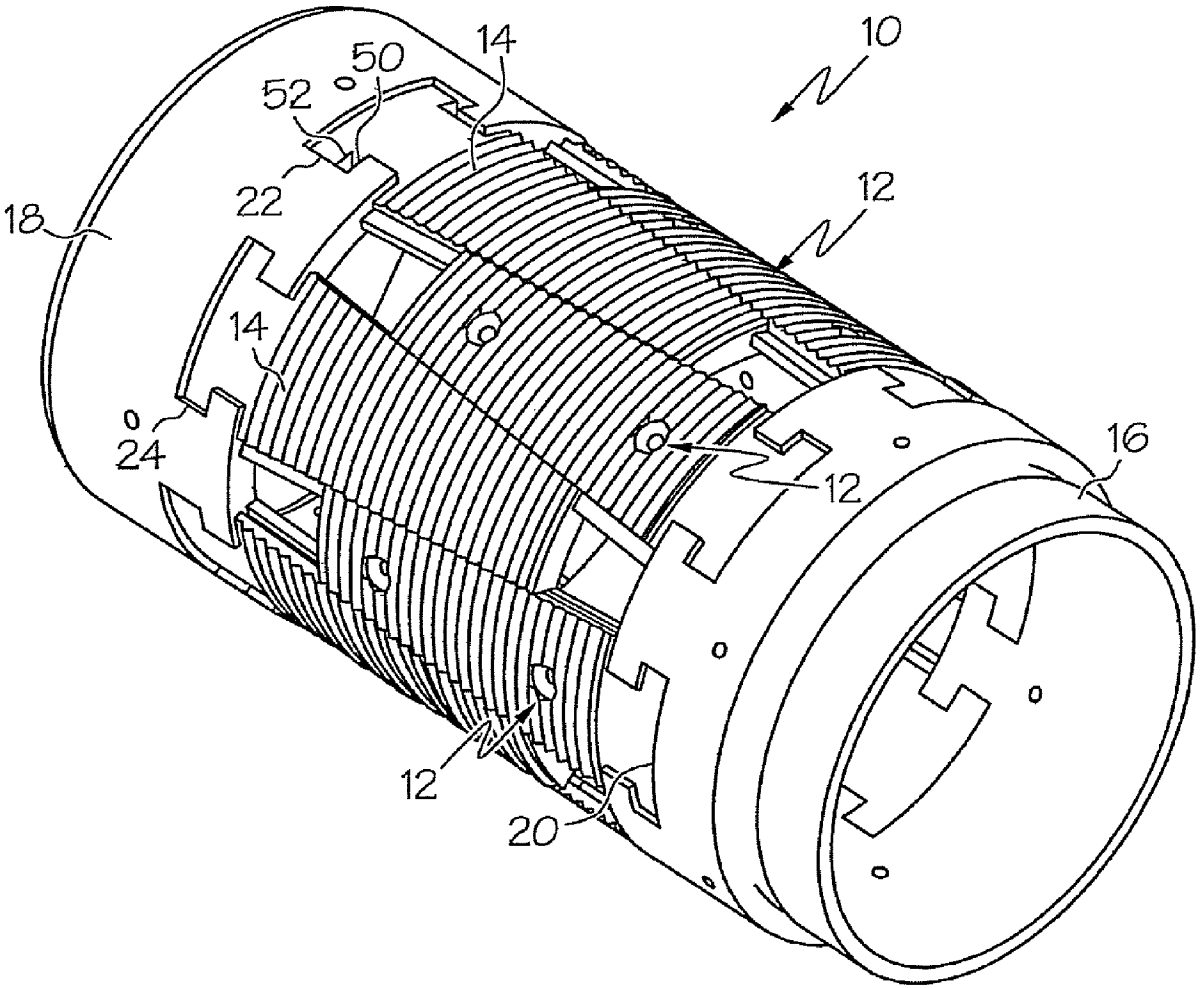
FIG. 2 is a perspective view of one embodiment of the slip system disclosed herein in a retracted position.

Finally, of note in FIGS. 1 and 2 is the trapezoidal shape of each of the slips 12 and 14. The trapezoidal shape is important because it facilitates radial expansion of the slip system 10 upon axial compression of the system 10 into a shorter axial dimension. Growth in the radial direction is of course important to a slip system because it is such radial growth that allows the system itself to become anchored into the receiving tubular structure. Because of the trapezoidal shape and positioning of that shape, each slip acts as a wedge (perimetrically) against its two neighboring slips. When the axial length of system 10 is increased, the radial dimension of the system 10 will necessarily and naturally decrease.

It is to be noted that the radial expansion of system 10 is affected entirely by tangential application of force through the slips 12 and 14; this means that the ID of the slip system can remain completely open and that conical structures previously used to radially displace slips are not necessary.

Figure 3:
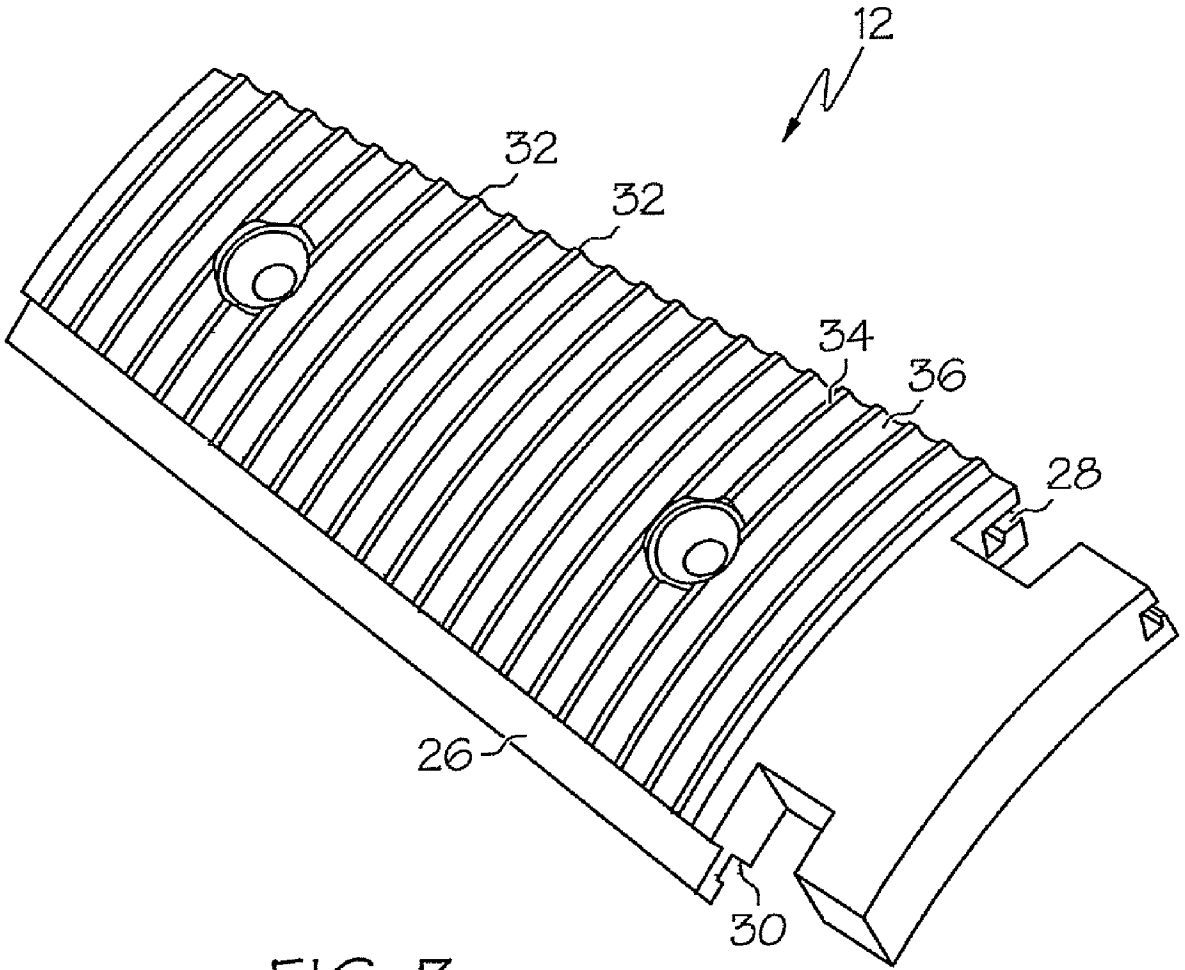
FIG. 3 is a perspective view of one of the slips from the illustration of FIG. 1.

Referring now to FIG. 3, one of the drive slips 12 is illustrated in perspective view and enlarged from the FIGS. 1 and 2 views. In the FIG. 3 view there is visible interlocking members provided in each of the slips in order to keep them engaged as a single unit while simultaneously allowing them to slide relative to each other. Each one of the slips includes a keyed flange 26, which in the embodiment illustrated, is of L-shape but may be of any shape that allows sliding motion while inhibiting disassociation of each slip from its neighboring slip. On an opposite side of slip 12 is a complementary flange keyhole 28, one end of which is visible. It will be understood that the flange keyhole 28 extends the length of slip 12 as does keyed flange 26. If one were to obtain an opposing slip (i.e. slip 14) one would notice that the keyed flange 26 and the flange keyhole 28 can be engaged as the slips 12 and 14 slid axially relative to one another. Sliding movement is thus enabled while lateral disassociation is prevented or at least inhibited.

It should also be noted in passing that an angle of the mating surfaces 30, on each slip 12 and 14, is dictated by a radius extending from the axis of system 10. This angle ensures smooth and distributed contact along each face 30 to improve overall efficiency and strength of system 10.

Still referring to FIG. 3, drive slips 12 of the current disclosure possess a number of wickers 32, a substantial number of which are truncated. In the illustrated embodiment, all of the wickers 32 are truncated, but it is to be appreciated that merely a substantial number of the wickers must be truncated to achieve the benefit of distribution of stresses in the receiving tubular structure. It is possible to add pointed wickers without departing from the scope of the invention. Truncation 34 removes what would otherwise be a sharper point of a slip gripping wicker. In one embodiment the truncation amount is of a dimension that is about the same as the amount of a sharp wicker that would be embedded in the material of the receiving tubular structure. Slips 12 are so configured to enhance retrieveability of the slip system 10 as well as assist in the distribution of stresses in the receiving tubular structure.

Each one of the wickers 32 that is truncated, is so truncated to an extent about equal to the amount of penetration into the receiving tubular structure that is anticipated for pointed wickers on the gripping slips 14. The reason for this is so that when the pointed wickers are maximally embedded in the receiving tubular structure, the wickers 32 will be radially loaded against the receiving tubular structure without penetrating it into. This distributes the stresses of the receiving tubular structure more evenly about the tubular structure consistent with contact around the entirety of the slip system 10. One further benefit of the configuration of slips 12 is realized in the case of paraffin or other debris lining the inside dimension of the receiving tubular structure. Because wickers 32 are still above the surface of slips 12, those wickers are able to penetrate debris at the inside dimension of the receiving tubular structure and still ensure contact of truncation 34 with the inside dimension surface of the receiving tubular structure forming a frictional engagement therewith.

Each wicker 32, of course, possesses a pair of flanks 36, which in one embodiment, are positioned at 45°. It is to be understood that other angles are possible. It is also noted that in the system 10, it is not necessary to harden wickers 32, as they are not intended to bite into the receiving tubular structure. This is not to say that it is undesirable to harden wickers 32 but merely that it is not necessary to do so.

Figure 4:
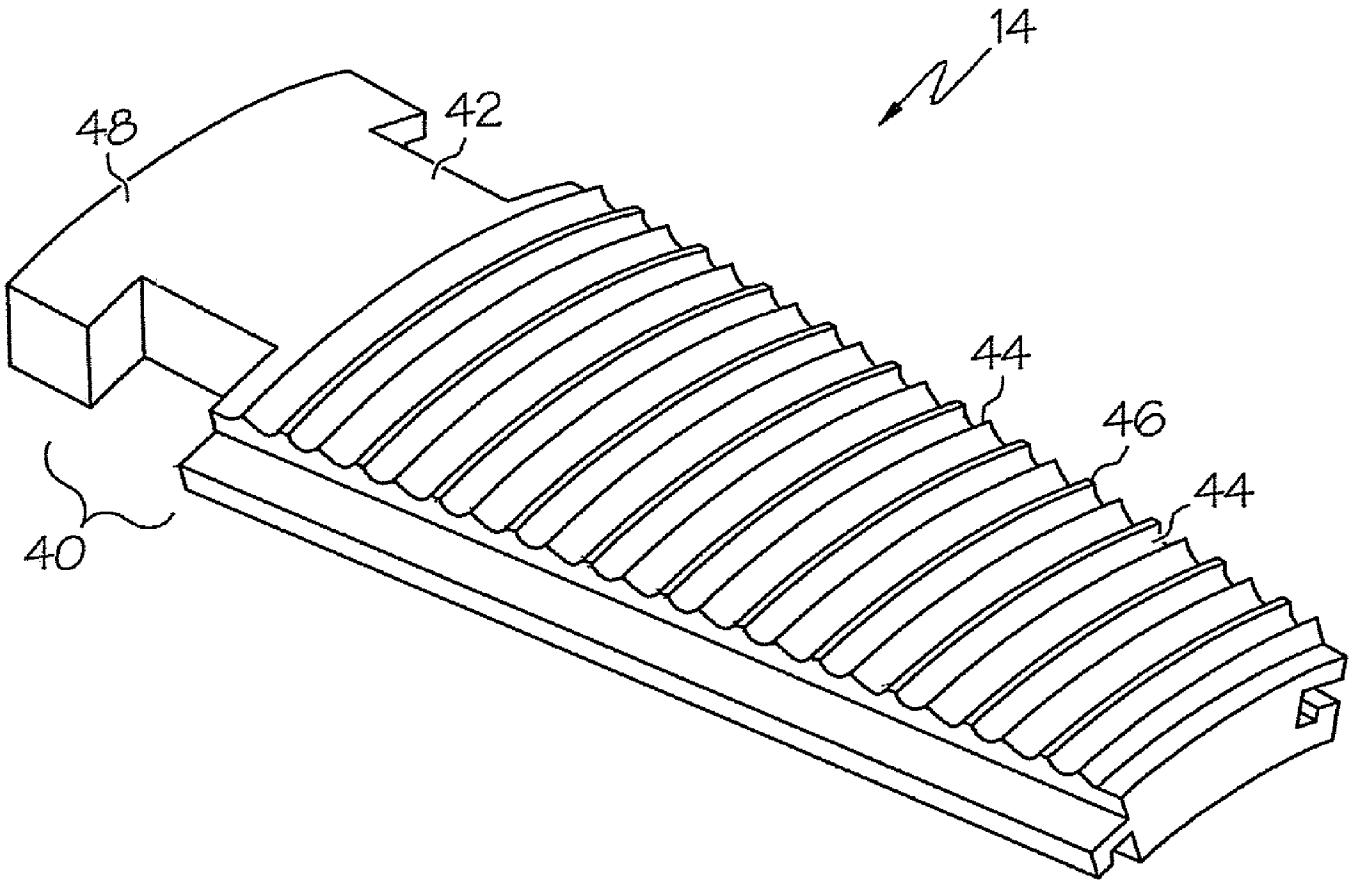
FIG. 4 is a perspective view of another of the slips illustrated in FIG. 1 having a distinct wicker configuration.

Referring to FIG. 4, one of the gripping slips 14 is illustrated. It will be noted that there are two distinguishing features of gripping slip 14 over driving slip 12 as illustrated in FIG. 3. These are a length 40 of a T-upright 42, and a configuration of wickers 44 and 46. Addressing the wickers first, it will be apparent that in the illustrated embodiment, every other wicker is sharp pointed (wicker 44) while the intervening wickers 46 are truncated (single alternating). In this embodiment, the degree of truncation of wickers 46 is roughly equal to the expected penetration of wickers 44 into the receiving tubular structure (not shown). Again the purpose for this construction, like that of the drive slip illustrated in FIG. 3, is to distribute the load on the receiving tubular structure imparted by radial motion of slip system 10. More specifically, upon full penetration of wickers 44 into the receiving tubular structure, wickers 46 come into contact with the inside diameter of the receiving tubular structure thereby distributing stress in that structure. It is to be appreciated that only one embodiment of the slip system contemplated is shown in FIG. 4. It is also possible for numbers of wickers 44 and 46 to be grouped such as two wickers 44 alternating with two wickers 46 (double alternating) or three wickers 44 alternating with three wickers 46 (triple alternating) or even a number of sharp wickers 44 alternating with a different number of truncated wickers 46 (random alternating). The overall point of alternating sharp and truncated wickers is to distribute stress otherwise imparted in an undistributed way to the receiving tubular structure. It is further possible to retain all of the wickers on slips 14 in the 44 configuration in some embodiments of the invention, since the truncated wickers 32 on the drive slips 12 will still substantially balance stresses in the receiving tubular structure. It will also be noted that pointed wickers 44 should be hardened such that they are sufficiently durable to penetrate the inside diameter of the receiving tubular structure.

Addressing now the upright 42 of the key structure 48, and referring to both FIGS. 3 and 4, it is apparent that the length 40 of the upright section 22 is longer than that of the comparable portion of slip 12. The reason for the length of this portion of slip 14 is to delay a tensile force being applied to this slip 14 when retraction of the slip system 10 is desired. Referring back to FIGS. 1 and 2 and reiterating that the T-shaped slots 22 and 24 are distinct, a review of the drawing will make clear that T-shaped slots 24, upon an axial tensile load on ring 18, will cause an immediate transfer of the tensile load to the associated slip 14. This is distinct from the T-shaped slots 22 wherein the same tensile load applied to ring 18, is not immediately transferred to the associated slip 14 but rather the ring 18 must axially move relative to the associated slip 14 until surface 50 contacts surface 52. Upon this contact, the tensile load will be transmitted to the associated slip 14. In such configuration it will be appreciated that every other slip 14, in the illustrated embodiment, will be pulled in a direct commensurate with retracting the slip system 10 prior to the other slips 14 being so pulled. This reduces the force necessary to retract the slip system 10. In the illustrated embodiment, the force is roughly halved while in other embodiments with differing numbers of alternating T-shaped slots 22 and 24, the reduction in tensile force required will be describable as a percentage of the whole proportional to the number of earlier pulled slips relative to the total number of slips associated with the subject ring.

It will be noted by the astute reader that ring 16 contains only T-shaped slot 20. The reason that the staggered T-shaped slots are not required on ring 16 is that all of the associated slips 12 substantially lack gripping wickers and therefore, the tensile force required to unseat them is substantially less than that of the slips 14. Therefore, there is no need to stagger the T-shaped slots in ring 16. This is by no means to say that it is inappropriate to stagger T-shaped slots 20, as it certainly is not only possible and functional, but rather merely to state that it is unnecessary.

Figure 5:
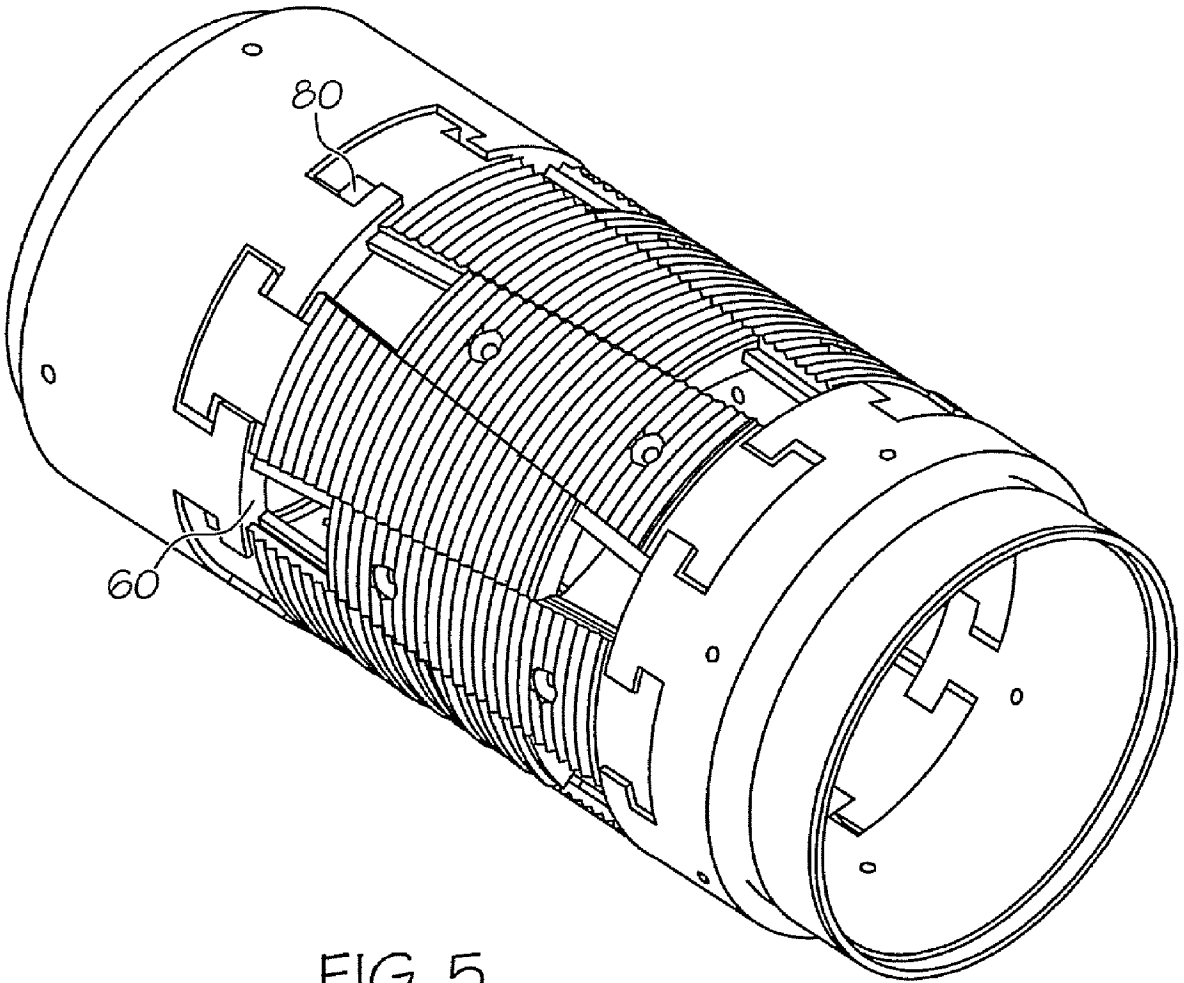
FIG. 5 is an illustration of an alternate slip ring configured to unset the slip system.

Referring to FIG. 5, an alternate embodiment of ring 18 is illustrated which allows for the T-shaped structures on each of the slips 14 to be identical. In this embodiment, the T-shaped structure 48 is not required to be long, as it is illustrated in the FIG. 1 and FIG. 2 embodiments. It will be appreciated that the reason that the elongated section 42 is not needed, is that surface 50 of slots 22 is positioned closer to an end 60 of ring 18 than it is in the FIG. 1 embodiment. One will also note that the clearances between the T-shaped structure 48 and the slots 22 has also been increased to account for potential axial movement of the system. This additional clearance alleviates unnecessary load on the structure 48 when the system is set.

While the figures in this application may suggest to one of ordinary skill in the art the existence of a clear uphole end and downhole end of slip system 10, based upon conventional illustration methods, it is to be understood that slip system 10 is usable with either end uphole. Generally, it will be desirable to impart a compressive setting force against ring 16 and the drive slips 12 while maintaining ring 18 and gripping slips 14 stationary. This is, however, not a requirement and the slip system 10 is to be understood to be actuable and retractable from either end. It is also to be understood that the system is actuable and retractable from a position downhole of the system of a position uphole of the system.

While preferred embodiments have been shown and described, modifications and substitutions may be made thereto without departing from the spirit and scope of the invention. Accordingly, it is to be understood that the present invention has been described by way of illustrations and not limitation.

The invention claimed is:

1. A slip system comprising:

a set of drive slips having wickers thereon, all of which being truncated in cross-section;

a set of gripping slips operatively interengagable with the set of drive slips;

a drive slip end ring in operable communication with the set of drive slips; and a gripping slip end ring in operable communication with the set of gripping slips, the end rings capable of transmitting a load applied in an axial direction of the system to the set of gripping slips and the set of drive slips to tangentially load the set of drive slips and the set of gripping slips against each other thereby increasing a radial dimension of the system and distributing stresses created in a target tubular.

2. The slip system as claimed in claim 1 wherein the wherein the drive slips engage only frictionally with a target tubular.

3. The slip system as claimed in claim 1 wherein the truncation is by an amount about the same as an amount a sharp wicker having similar dimensions and flank angles would be expected to penetrate a target tubular.

4. The slip system as claimed in claim 1 wherein the gripping slips possess at least one truncated wicker.

5. The slip system as claimed in claim 1 wherein the gripping slips possess a plurality of truncated wickers.

6. The slip system as claimed in claim 5 wherein the truncated wickers are positioned on each gripping slip to distribute applied stress in a target tubular.

7. The slip system as claimed in claim 5 wherein the truncated wickers are positioned on each gripping slip in an alternating pattern with sharp wickers.

8. The slip system as claimed in claim 7 wherein the pattern is a single alternating pattern.

9. The slip system as claimed in claim 7 wherein the pattern is a double alternating pattern.

10. The slip system as claimed in claim 7 wherein the pattern is a triple alternating pattern.

11. The slip system as claimed in claim 7 wherein the pattern is a random pattern of truncated and sharp wickers.

12. The slip system claimed in claim 1 wherein the drive end ring includes a plurality of interengagement slots.

13. The slip system as claimed in claim 12 wherein the slots are all the same dimensions and shape.

14. The slip system as claimed in claim 12 wherein the slots are T-shaped.

15. The slip system as claimed in claim 1 wherein the grip end ring includes a plurality of interengagement slots.

16. The slip system claimed in claim 1 wherein each slip of the set of slips includes a keyed flange and a flange keyhole.

17. A method for distributing stress in a target tubular imparted by a slip system as claimed in claim 1 comprising:

embedding a plurality of sharp wickers of the slip system into the target tubular; and contacting an inside dimension of the target tubular with a plurality of truncated wickers.

18. A slip system comprising:

a set of drive slips having wickers thereon, substantially all of which being truncated in cross-section and wherein the drive slips engage only frictionally with a target tubular;

a set of gripping slips operatively interengagable with the set of drive slips;

a drive slip end ring in operable communication with the set of drive slips; and a gripping slip end ring in operable communication with the set of gripping slips, the end rings capable of transmitting a load applied in an axial direction of the system to the set of gripping slips and the set of drive slips to tangentially load the set of drive slips and the set of gripping slips against each other thereby increasing a radial dimension of the system and distributing stresses created in a target tubular.

19. A slip system comprising:

a set of drive slips having wickers thereon, all of which being truncated in cross-section;

a set of gripping slips operatively interengagable with the set of drive slips;

a drive slip end ring in operable communication with the set of drive slips; and a gripping slip end ring having a plurality of interengagement slots of differing dimensions, the gripping end ring in operable communication with the set of gripping slips, the end rings capable of transmitting a load applied in an axial direction of the system to the set of gripping slips and the set of drive slips to tangentially load the set of drive slips and the set of gripping slips against each other thereby increasing a radial dimension of the system and distributing stresses created in a target tubular.

20. A slip system comprising:

a set of drive slips having wickers thereon, all of which being truncated in cross-section;

a set of gripping slips operatively interengagable with the set of drive slips;

a drive slip end ring in operable communication with the set of drive slips; and a gripping slip end ring having a plurality of interengagement slots configured to selectively load in tension certain ones of the set of gripping slips, the gripping end ring in operable communication with the set of gripping slips the end rings capable of transmitting a load applied in an axial direction of the system to the set of gripping slips and the set of drive slips to tangentially load the set of drive slips and the set of gripping slips against each other thereby increasing a radial dimension of the system and distributing stresses created in a target tubular.

*21. A slip system for anchoring a body to a surrounding tubular at a subterranean location, comprising:*

*a body;*

*at least one drive slip with a truncated wicker cross-section on said body that does or do not penetrate the surrounding tubular;*

*at least one gripping slip on said body operatively interengagable with said drive slip for relative axial movement therebetween, said gripping slip penetrates the surrounding tubular;*

*said relative movement creating tangential loading between said set of drive slips and said set of gripping slips thereby increasing a radial dimension of the system*

*for support of said body from the surrounding tubular and to distribute stresses created in the surrounding tubular.*

*22. The system of claim 21, wherein:*

*said truncated wicker cross-section comprises an outer surface that prevents further penetration of the surrounding tubular by said gripping slip when said outer surface engages the surrounding tubular.*

*23. The system of claim 21, wherein:*

*said radial dimension of said system is decreased by initial movement of said drive slip.*

*24. The system of claim 23, wherein:*

*said gripping slip engaged to a gripping slip actuator with a lost motion feature to allow a drive slip actuator to initially axially move said drive slip before said gripping slip is moved.*

*25. The system of claim 21, wherein:*

*said drive member and said gripping member move in opposed directions.*

*26. The system of claim 21, wherein:*

*said drive slip and said gripping slip each have integrated edge configurations that interlock for slidable movement to change the dimension of the system.*

*27. The system of claim 21, wherein:*

*said drive slip frictionally engages the surrounding tubular.*

*28. The system of claim 21, wherein:*

*said gripping slip comprises at least one sharp wicker.*

*29. The system of claim 28, wherein:*

*said gripping slip comprises at least one truncated wicker.*

*30. A slip system comprising:*

*a set of drive slips that engage only frictionally with a target tubular;*

*a set of gripping slips operatively interengagable with the set of drive slips;*

*a drive slip end ring in operable communication with the set of drive slips; and*

*a gripping slip end ring in operable communication with the set of gripping slips, the end rings capable of transmitting a load applied in an axial direction of the system to the set of gripping slips and the set of drive slips to tangentially load the set of drive slips and the set of gripping slips against each other thereby increasing a radial dimension of the system and distributing stresses created in a target tubular.*

*31. A slip system comprising:*

*a set of drive slips that engage only frictionally with a target tubular;*

*a set of gripping slips operatively interengagable with the set of drive slips;*

*a drive slip end ring in operable communication with the set of drive slips; and*

*a gripping slip end ring having a plurality of interengagement slots of differing dimensions, the gripping end ring in operable communication with the set of gripping slips, the end rings capable of transmitting a load applied in an axial direction of the system to the set of gripping slips and the set of drive slips to tangentially load the set of drive slips and the set of gripping slips against each other thereby increasing a radial dimension of the system and distributing stresses created in a target tubular.*

*32. A slip system comprising:*

*a set of drive slips that engage only frictionally with a target tubular;*

*a set of gripping slips operatively interengagable with the set of drive slips;*

*a drive slip end ring in operable communication with the set of drive slips; and*

*a gripping slip end ring having a plurality of interengagement slots configured to selectively load in tension certain ones of the set of gripping slips, the gripping end ring in operable communication with the set of gripping slips the end rings capable of transmitting a load applied in an axial direction of the system to the set of gripping slips and the set of drive slips to tangentially load the set of drive slips and the set of gripping slips against each other thereby increasing a radial dimension of the system and distributing stresses created in a target tubular.*

* * * * *